Feb. 19, 1929.

E. L. HAUMAN 1,702,942

METHOD, APPARATUS, AND PRODUCT OF TREATING REFRACTORY MATERIAL

Filed Oct. 11, 1926

Inventor
Earl L. Hauman

By Ellis Spear Jr.
Attorney

Patented Feb. 19, 1929.

1,702,942

UNITED STATES PATENT OFFICE.

EARL LEESON HAUMAN, OF HAMBURG, NEW YORK, ASSIGNOR TO THE EXOLON COMPANY, OF BLASDELL, NEW YORK, A CORPORATION OF MASSACHUSETTS.

METHOD, APPARATUS, AND PRODUCT OF TREATING REFRACTORY MATERIAL.

Application filed October 11, 1926. Serial No. 141,021.

My present invention relates to the treatment of refractory materials and particularly to the novel methodical production of treated masses of such material of great utility and advantage in certain industries. While my method and resultant products are capable of use in connection with a considerable variety of materials, it may be conveniently discussed in its relation to such granular material as abrasives. In one phase of its application, it is employed as a further improvement of my previous invention in the art of reclaiming bonded abrasives for which I have already made application for Letters Patent, Serial Number 119,334, filed June 29, 1926.

As my present method and product are of such importance in the treatment of bonded crystals, or similar materials to be freed from bond or otherwise reclaimed without the destruction or serious affection of their desired state, I will make my present disclosure rather in terms of that art as it will be readily understood from such disclosure how my invention can be applied to the treatment of other materials and in other arts.

The advantages gained by my present invention are primarily those of economy although a greater perfection in the result sought is also attained. The factor of economy is important, however, as these problems are primarily ones of salvage of what has heretofore been waste and the great utility in normal times lies in the saving effected over the cost of manufacture of the material to be salvaged.

The conditions of the problem involve volume of product and equipment for the same. The former must be large, but the latter cannot be equally enlarged without a disproportional investment in retorts and other apparatus, nor can the material be handled economically on a piecemeal basis. The manufacturing problem was therefore to meet the dilemma imposed by these conflicting requirements.

This primary part of my invention resides in the development of a super pig from a heat source of ordinary capacity. The other conceptions have developed about this.

My invention is most readily understood from illustration and in the accompanying drawings I have shown a characteristic form of apparatus well adapted to the practice of my method which I will describe in connection therewith.

Throughout the specification and drawings like reference characters are employed to indicate corresponding parts, and in the drawings.

Figure 1:
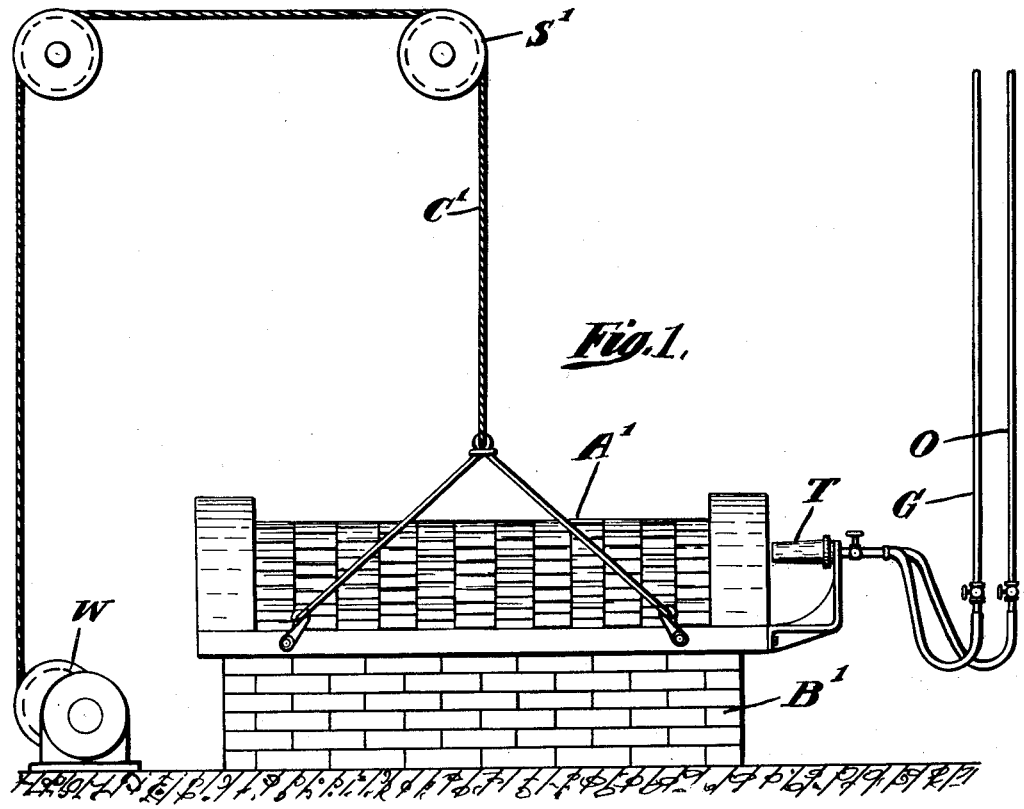
Fig. 1 is an elevation of a retort having a movable arch.

In the drawings, I have indicated the pig generally by the reference character P and its successive layers or accretions as $p^1$, $p^2$, $p^3$, etc.

As above stated, my invention is applicable to a considerable variety of materials of which abrasives and refractory lining materials are fairly representative. While I have thus differentiated between refractory materials and abrasives, I intend generally to use the term "refractory" herein as indicating any fire resistant material. For the method in my previous application above referred to, my invention is of great value in securing a mass in which the bond or material to be removed has become converted to a form easy to remove. Notably this is the bond which is converted by means of the fluxing agent to a frangible and easily soluble state. In the specific instance noted the abrasive mentioned may be considered as bonded silicon carbide, the bond being generally a ceramic bond, although it may be any other ordinary commercial bond that may be so fused or may be burned out. Furthermore, it will be understood that my present invention applies to heat treatments where no bond is present as in the roasting of abrasives or refractory grains in an oxidizing or surface treatment.

The apparatus shown comprises a vertically adjustable arch $A^1$. The arch $A^1$ is capable of vertical adjustment by means of a cable $C^1$ which is passed over pulleys $S^1$ and wound on a winch W.

Beneath the arch $A^1$ is formed a wall $B^1$ of fire brick or other heat resistant material which contains the charge of material to be heated. Each charge is walled to a pre-determined depth generally about one-half inch to one and one-half inches, and its upper surface spaced from the lower or inner surface of the arch $A^1$ to effect a maximum efficiency.

The heat supplied to its surface may be by reflection from a refractory roof or by radiation from a radiant surface. In the apparatus shown, I have indicated a torch T fed by an oil conduit O and an air supply G.

Figure 2:
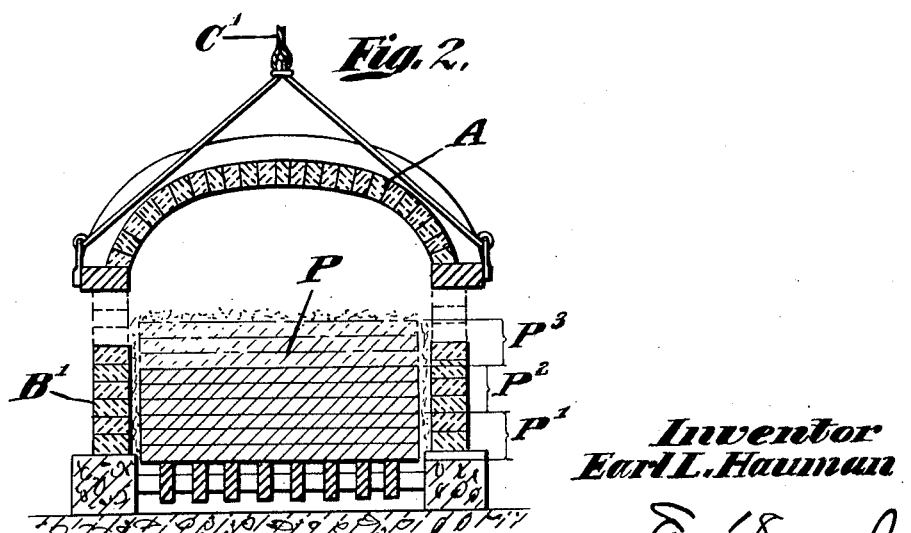
Fig. 2 is a transverse section of Fig. 1.

When the initial charge is treated to fuse the bond with the borax or borate to reduce it to a frangible glass, and the initial pig $P^1$ is still in its heated condition, I raise the arch $A^1$ (Figs. 1 and 2) to produce a separation between the pig surface and the heat surface.

I then supply additional material to form a second layer for a secondary strata or pig part $P^2$ fused upon and to the first portion $P^1$. The second portion $P^2$ is heated by the first from below and by the heat surface from above and is rapidly and economically brought to its desired condition.

In preparing for the second pig, the retaining wall is run up by the addition of bricks to hold the added charge and the steps are similarly continued until a pig of the desired size is completed.

In this way, a pig can be formed of several tons and capable of being efficiently handled and worked. This is broken and crushed and treated as may be desired. In my previous application above referred to the fused bond is pulverized and eliminated to give a free reclamation grain of high value.

The apparatus may obviously be varied and the pig variously shaped and formed. The pig can be disposed as desired and the heat applied as desired. The utilization of a heat reflecting or radiating surface is of known efficiency but other modes may be employed. All such modifications and variants are to be considered as within the purview of my invention as defined in the appended claims.

I claim:

1. A heat reaction mass consisting of progressively exposed surfaces of treated refractory material.

2. A heat reaction mass consisting of progressively accumulated layers of treated refractory material.

3. A composite pig consisting of progressively accumulated layers of treated bonded refractory material.

4. The method of treating a refractory material consisting in reactively heating progressively exposed surfaces of material to form a uniformly reacted mass.

5. The method of treating a refractory material consisting in reactively heating progressively superimposed layers of material to form a uniformly reacted mass.

6. The method of treating a bonded refractory material consisting in reactively heating progressively superimposed layers of the material to form a uniformly reacted mass.

7. The method of reducing a bonded material consisting in progressively accumulating heat exposed layers of the comminuted material with a flux to form a substantially homogeneous pig.

8. The method of reducing a bonded material consisting in progressively exposing superimposed layers of the comminuted material with a flux to form a substantially homogeneous pig.

9. A reduction pig of bonded material consisting of progressively accumulated layers of heat exposed material.

10. In the method of freeing a bonded abrasive from its bond, that step consisting in exposing successive superimposed layers of comminuted material and flux to heat to fuse the bond.

11. In the method of freeing a bonded abrasive from its bond, that step consisting in exposing successive superimposed layers of comminuted material and flux to heat while maintaining each successive layer at substantially a predetermined distance from the heat source during fusion.

12. In the method of freeing a bonded abrasive from its bond, that step consisting in exposing successive superimposed layers of comminuted material and flux to an indirect heat while maintaining each successive layer at substantially a predetermined distance from the heat source during fusion.

13. In a step by step retort of the class described, a heat delivering surface, and a material support, and means for progressively separating said heat surface and said support to maintain the surfaces of successive layers of material in predetermined spaced relation thereto.

14. In a step by step retort of the class described, an arch, and a material support, and means for progressively separating said arch and said support to maintain the surfaces of successive layers of material in predetermined spaced relation thereto.

15. In the reduction of a material in a retort having a heat delivering surface those steps consisting in building successive layers of the material in superimposed relation and relatively separating the surface of the reduced layer and the heat surface to separate the surface of the next succeeding layer from the heat surface and maintain a predetermined spaced relation thereto.

16. In the reduction of a material in a retort having an arch those steps consisting in building successive layers of the material in superimposed relation and relatively separating the surface of the reduced layer and the arch to separate the surface of the next succeeding layer from the heat surface and maintain a predetermined spaced relation thereto.

17. In the reduction of a material in a retort having a movable arch consisting in building successive layers of the material in superimposed relation and in raising the arch to relatively separate the surface of the reduced layer and the arch to separate the surface of the next succeeding layer from the heat surface and maintain a predetermined spaced relation thereto.

In testimony whereof I affix my signature.
EARL LEESON HAUMAN.